(12) United States Patent
Chaudhary et al.

(10) Patent No.: US 8,460,770 B2
(45) Date of Patent: Jun. 11, 2013

(54) IN SITU MOISTURE GENERATION AND USE OF POLYFUNCTIONAL ALCOHOLS FOR CROSSLINKING OF SILANE-FUNCTIONALIZED RESINS

(75) Inventors: Bharat I. Chaudhary, Princeton, NJ (US); Jeffrey M. Cogen, Flemington, NJ (US); Saurav S. Sengupta, Somerset, NJ (US)

(73) Assignee: Dow Global Technologies LLC, Midland, MI (US)

( * ) Notice: Subject to any disclaimer, the term of this patent is extended or adjusted under 35 U.S.C. 154(b) by 330 days.

(21) Appl. No.: 12/740,838

(22) PCT Filed: Oct. 13, 2008

(86) PCT No.: PCT/US2008/079724
§ 371 (c)(1),
(2), (4) Date: Apr. 30, 2010

(87) PCT Pub. No.: WO2009/058545
PCT Pub. Date: May 7, 2009

(65) Prior Publication Data
US 2010/0297374 A1 Nov. 25, 2010

Related U.S. Application Data

(60) Provisional application No. 60/984,422, filed on Nov. 1, 2007.

(51) Int. Cl.
| | |
|---|---|
| *B32B 1/02* | (2006.01) |
| *B32B 1/08* | (2006.01) |
| *C08F 8/00* | (2006.01) |
| *C08F 273/00* | (2006.01) |
| *C08F 130/08* | (2006.01) |
| *C08G 77/442* | (2006.01) |

(52) U.S. Cl.
USPC ......... 428/35.7; 428/36.9; 525/106; 525/288; 525/326.5; 525/474

(58) Field of Classification Search
USPC .............. 428/35.7, 36.9; 521/154; 525/326.5, 525/474, 288, 106
See application file for complete search history.

(56) References Cited

U.S. PATENT DOCUMENTS

| | | | |
|---|---|---|---|
| 4,144,202 A | 3/1979 | Ashcraft et al. | |
| 5,064,802 A | 11/1991 | Stevens et al. | |
| 5,246,783 A | 9/1993 | Spenadel et al. | |
| 5,272,236 A | 12/1993 | Lai et al. | |
| 5,278,272 A | 1/1994 | Lai et al. | |
| 5,986,028 A | 11/1999 | Lai et al. | |
| 6,496,629 B2 | 12/2002 | Ma et al. | |
| 6,714,707 B2 | 3/2004 | Rossi et al. | |
| 2006/0177774 A1* | 8/2006 | Abdallah et al. | 430/311 |
| 2006/0247376 A1* | 11/2006 | Hasegawa et al. | 525/123 |
| 2007/0244241 A1* | 10/2007 | Masuda et al. | 524/436 |

FOREIGN PATENT DOCUMENTS

| | | | |
|---|---|---|---|
| DE | 1812003 A1 | 6/1970 | |
| DE | 2342372 A1 | 3/1974 | |
| DE | 2342432 A1 | 3/1974 | |
| DE | 2453326 A1 | 5/1975 | |
| EP | 1637565 A1 | 3/2006 | |
| WO | 93/19104 A1 | 9/1993 | |
| WO | 95/00526 A1 | 1/1995 | |
| WO | 95/14024 A1 | 5/1995 | |
| WO | 98/49212 A1 | 11/1998 | |
| WO | WO 2005/003199 | * | 1/2005 |

OTHER PUBLICATIONS

Randall, J., JMS—Rev. Macromol. Chem. Phys., C29 (2&3), 201-317 (1989).

* cited by examiner

*Primary Examiner* — Erik Kashnikow
(74) *Attorney, Agent, or Firm* — Whyte Hirschboeck Dudek SC

(57) ABSTRACT

Polymer compositions comprise a (i) silane-functionalized polymer, e.g., a polyethylene grafted with vinyl triethoxy silane, (H) polyfunctional alcohol e.g., α,α,α',α'-tetramethyl-I,3-benzenediethanol and, optionally, (iii) acid, e.g., an alkylated aryl disulfonic acid. The use of polyfunctional alcohols in the absence of a strong acid yields a light-crosslinking of the silane-functionalized polymer and this, in turn, provides a polymer melt with improved extensional properties such as elongational viscosity and melt strength. The use of a polyfunctional alcohol in combination with a blocked strong acid provides a slow rate of crosslinking during melt processing and a high degree of ultimate crosslinking after the polymer composition has been shaped or molded.

9 Claims, 3 Drawing Sheets

◇ A6451
□ A6451 WITH 0.2 WT% B201
△ A6451 WITH 0.7 WT% NACURE 1419
× A6451 WITH 0.2 WT% B201+1 WT% $\alpha,\alpha,\alpha',\alpha'$-TETRAMETHYL-1,3-BENZENEDIMENTHANOL
○ A6451 WITH 0.7 WT% NACURE 1419+1 WT% $\alpha,\alpha,\alpha',\alpha'$-TETRAMETHYL-1,3-BENZENEDIMENTHANOL
+ A6451 WITH 1 WT% $\alpha,\alpha,\alpha',\alpha'$-TETRAMETHYL-1,3-BENZENEDIMENTHANOL

IN SITU MOISTURE GENERATION AND USE OF POLYFUNCTIONAL ALCOHOLS FOR CROSSLINKING OF SILANE-FUNCTIONALIZED RESINS

CROSS REFERENCE TO RELATED APPLICATION

This application claims the benefit of U.S. Provisional Application No. 60/984,422, filed Nov. 1, 2007, which application is fully incorporated herein by reference.

FIELD OF THE INVENTION

This invention relates to the crosslinking of resins. In one aspect, the invention relates to the crosslinking of silane-functionalized resins while in another aspect, the invention relates to the crosslinking of such resins using a polyfunctional alcohol. In yet another aspect, the invention. relates to the crosslinking of such resins using an alcohol in combination with an acid catalyst. In still another aspect, the invention relates to the manufacture of cable insulation and sheathing and other products made from such crosslinked resins.

BACKGROUND OF THE INVENTION

In the fabrication of articles such as cables, pipes, footwear, foams and the like, the polymeric compositions from which these articles are made must often be melt blended. The compositions often comprise silane-functionalized resins and a catalyst, and these resins undergo crosslinking through their silane functionalities upon exposure to moisture at either ambient or an elevated temperature. One key requirement in this process is to minimize scorch, i.e., premature crosslinking, of the resin during the melt processing, e.g., extrusion, molding, etc. The minimization of scorch is typically achieved by using "dry" compositions during melt processing at temperatures above the melting point of the resin (e.g., above 200° C. in the case of polyethylene), and the addition of scorch retardants, e.g., a monomeric silane, etc.

Another important consideration in the fabrication of these articles is to achieve crosslinking within a short period of time, e.g., hours, days, after the melt processing is completed. This is achieved by curing at elevated temperatures, e.g., in excess of 70° C., and/or through the use of powerful catalysts such as sulfonic acids. As the thickness of the fabricated article increases, so does the time that moisture takes to diffuse into and through the polymer composition, even at elevated temperatures. This adds to the cost of the fabrication process. As such, the polymer fabrication industry has a continuing interest in accelerating the moisture-cure of silane-functionalized resins beyond that achievable with strong acids, and preferably with an acceptably low level of scorch.

SUMMARY OF THE INVENTION

In one embodiment, the invention is a polymer composition comprising a (i) silane-functionalized polymer, and either (ii) a polyfunctional alcohol, or (iii) an alcohol in combination with an acid or both. In another embodiment, the invention is a process of shaping and crosslinking a polymer composition, the composition comprising a (i) silane-functionalized polymer, and either (ii) a polyfunctional alcohol, or (iii) an alcohol in combination with an acid, the process comprising the steps of: (A) subjecting the polymer composition to melt processing conditions; (B) shaping the polymer composition while minimizing scorch; and (C) subjecting the shaped polymer composition to crosslinking conditions. In yet another embodiment, the invention is fabricated articles made from the shaped, crosslinked polymer composition.

The use of polyfunctional alcohols in the absence of acid yields a light-crosslinking of the silane-functionalized polymer and this, in turn, provides a polymer melt with improved extensional properties such as elongational viscosity and melt strength. The use of a polyfunctional alcohol in combination with a catalyst (such as acid) provides a slow rate of crosslinking during melt processing and a high degree of ultimate crosslinking after the polymer composition has been shaped or molded. In melt processing conditions, significant amounts of acid are available to generate in situ moisture which, in turn, promotes ultimate crosslinking under ambient and elevated temperature conditions. The polymer composition and process of this invention are particularly useful in the manufacture of cable insulation and sheathing, foams, footwear, pipes and polymer dispersions.

DESCRIPTION OF THE PREFERRED EMBODIMENT

Figure 1:
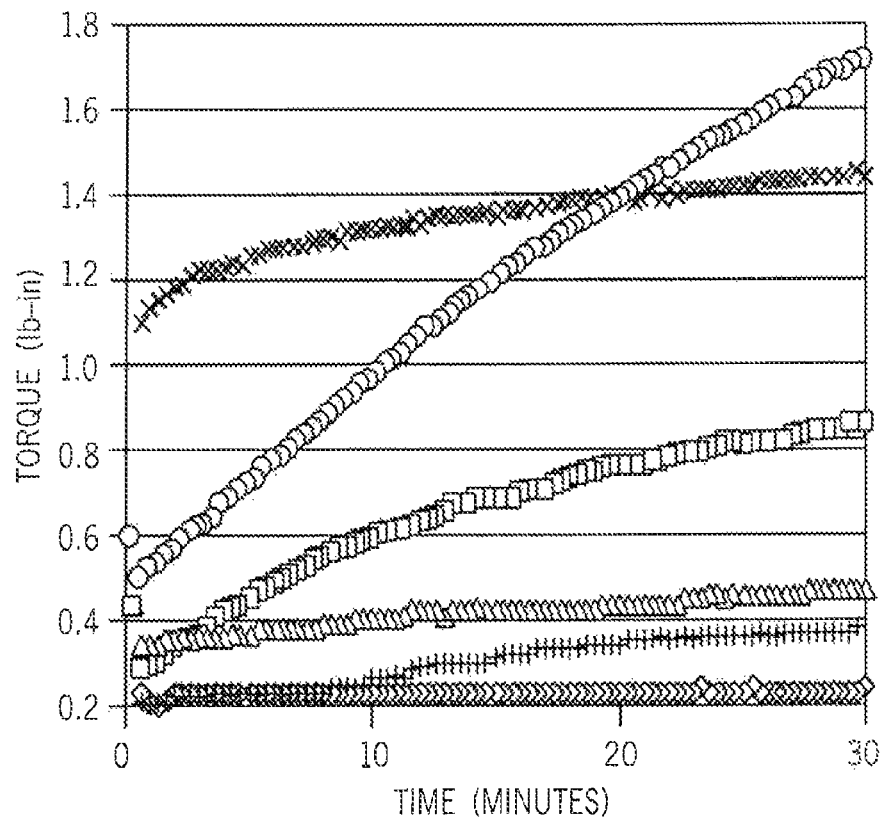
FIG. 1 is a graph reporting the results of moisture crosslinking of an ethylene-silane reactor copolymer with sulfonic acids at 182° C.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of polyfunctional alcohol and strong acid relative to the polymer and various temperature and other process ranges.

"Cable", "power cable", "transmission line" and like terms means at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Polyolefin", "PO" and like terms mean a polymer derived, from simple olefins. Many polyolefins are thermoplastic and for purposes of this invention, can include a rubber phase. Representative polyolefins include polyethylene, polypropylene, polybutene, polyisoprene and their various interpolymers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms means a mixture or blend of two or more components. In the context of a mix or blend of materials from which a cable sheath or other article of manufacture is fabricated, the composition includes all the components of the mix, e.g., silane-grafted polyolefin, lubricant, filler and any other additives such as cure catalysts, antioxidants, flame retardants, etc.

Polyolefins:

The polyolefins used in the practice of this invention, i.e., the polyolefins that contain silane functionality or are subsequently grafted with a silane, can be produced using conventional polyolefin polymerization technology, e.g., high-pressure, Ziegler-Natta, metallocene or constrained geometry catalysis. in one preferred embodiment, the polyolefin is made using a high pressure process. In another preferred embodiment, the polyolefin is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGC. The solution process is preferred. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well-known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from 10-12:1 to 10-1:1, more preferably from $10^{-9}$:1 to $10^{-5}$:1.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The polyolefin copolymers useful in the practice of this invention include ethylene/α-olefin interpolymers having a α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The polyolefins used in the practice of this invention can be used alone or in combination with one or more other polyolefins, e.g., a blend of two or more polyolefin polymers that differ from one another by monomer composition and content, catalytic method of preparation, etc. if the polyolefin is a blend of two or more polyolefins, then the polyolefin can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of polyolefins made with high pressure processes include (but are not limited to) low density polyethylene (LDPE), ethylene silane reactor copolymer (such as SiLINK® made by The Dow Chemical Company), ethylene vinyl acetate copolymer (EVA), ethylene ethyl acrylate copolymer (EEA), and ethylene silane acrylate terpolymers.

Examples of olefinic interpolymers useful in the practice of this invention include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

Exemplary polypropylenes useful in the practice of this invention include the VERSIFY® polymers available from The Dow Chemical Company, and the VISTAMAXX® polymers available from ExxonMobil Chemical Company. A complete discussion of various polypropylene polymers is contained in *Modern Plastics Encyclopedia*/89, mid October 1988 Issue, Volume 65, Number 11, pp. 86-92.

Silane-Crosslinker:

Any silane that will effectively copolymerize with olefins (such as ethylene), or graft to and crosslink the polyolefin polymers, can be used in the practice of this invention, and those described by the following formula are exemplary:

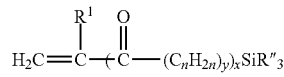

in which $R^1$ is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be copolymerized with a suitable olefin in a reactor, such as a high pressure process. Such silanes may also be grafted to a suitable polyolefin by the use of a suitable quantity of organic peroxide, either before or during a shaping or molding operation. Additional ingredients such as heat and light stabilizers, pigments, etc., also may be included in the formulation. In any case, the crosslinking reaction takes place following the shaping or molding step by moisture-induced reaction between the grafted or copolymerized silane groups, the water permeating into the bulk polymer from the atmosphere or from a water bath or "sauna". The phase of the process during which the crosslinks are created is commonly referred to as the "cure phase" and the process itself is commonly referred to as "curing".

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth) acryloxy propyl trimethoxy silane and mixtures of these silanes are the preferred silane crosslinkers for use in this invention, if filler is present, then preferably the crosslinker includes vinyl trialkoxy silane.

The amount of silane crosslinker used in the practice of this invention can vary widely depending upon the nature of the polymer, the silane, the processing or reactor conditions, the grafting or copolymerization efficiency, the ultimate application, and similar factors, but typically at least 0.5, preferably at least 0,7, weight percent is used. Considerations of convenience and economy are two of the principal limitations on the maximum amount of silane crosslinker used in. the practice of this invention, and typically the maximum amount of silane crosslinker does not exceed 5, preferably it does not exceed 3, weight percent.

The silane crosslinker is grafted to the polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.04, preferably at least 0.06, parts per hundred. resin (phr). Typically, the initiator does not exceed 0.15, preferably it does not exceed about 0.10, phr. The ratio of silane crosslinker to initiator also can vary widely, but the typical crosslinker:initiator ratio is between 10:1 to 30:1, preferably between 18:1 and 24:1. As used in parts per hundred resin or phr, "resin" means the olefinic polymer.

While any conventional method can be used to graft the silane crosslinker to the polyolefin polymer, one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half life of the initiator.

Copolymerization of vinyl trialkoxysilane crosslinkers with ethylene and other monomers may be done in a high-pressure reactor that is used in the manufacture of ethylene homopolymers and copolymers with vinyl acetate and acrylates.

Alcohols:

Alcohols used in this invention are used to serve two roles. Polyfunctional alcohols are used in this invention as crosslinking enhancers and participate in the silane crosslinking process. Alcohols in combination with catalytic amounts of acid undergo elimination reaction and release water. This moisture released in-situ helps in crosslinking by hydrolyzing the silanes.

Any alcohol with catalytic amounts of acid that can participate in an elimination reaction to release water can be used in this invention. This includes all primary, secondary and tertiary alcohols having one or more β-hydrogen atoms available to participate in the elimination reaction.

Suitable alcohols for this invention include those of the general formula $(RCH_2)_{3-x}CH_xOH$ where R is aliphatic or aromatic and x has values 0 to 2. Examples of alcohols for this application include 2-Methyl-1-phenyl-2-propanol, 1-Octanol, 2-Octanol, 3-Phenyl-1-propanol, 1-Phenyl-1-propanol and similar aliphatic and aromatic alcohols.

Suitable aliphatic polyols are for example diols which are linear or branched aliphatic glycols, in particular those containing 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is, for example, 1,4-dihydroxycyclohexane. Other suitable aliphatic diols are, for example, 1,4-bis(hydroxymethyl)cyclohexane, aromatic-aliphatic diols, such as p-xylylene glycol or 2,5-dichloro-p-xylylene glycol, 2,2-(beta-hydroxyethoxyphenyl)propane. The alkylene diols are preferably linear and preferably contain 2 to 4 carbon atoms. Another group of suitable aliphatic diols are the heterocyclic diols described in the German published patent specifications 1812003, 2342432, 2342372 and 2453326. Examples are: N,N'-bis(beta-hydroxyethyl)-5,5-dimethylhydantoin, N,N-bis(beta-hydroxypropyl)-5,5-dimethylhydantoin, methylene bis-[N-(beta-hydroxyethyl)-5-methyl-5-ethylhydantoin], methylene bis-[N-(beta-hydroxyethyl)-5,5-dimethylhydantoin], N,N'-bis(beta-hydroxyethyl)benzimidazolone, N,N'-bis(beta.-hydroxyethyl)-(tetrachloro)benzimidazolone or N,N'-bis(beta-hydroxyethyl)-(tetrabromo)benzimidazolone.

A suitable triol is for example

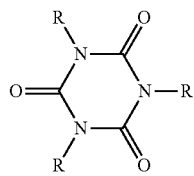

$R = CH_2-CH_2-OH$.

Acids: The preferred silanol condensation catalyst useful for crosslinking silane functional polyolefin is an alkylated aryl mono or disulfonic acid exemplified by

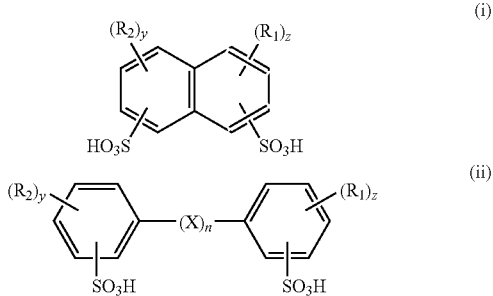

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of $-C(R_3)(R_4)-$, wherein each of $R_3$ and $R_4$ is hydrogen or independently a linear or branched alkyl group of 1-4 carbons and n is 1; $-C(=O)-$, wherein n is 1; $-O-$ wherein n is 1; $-S-$, wherein n is 1 to 3; and $-S(O)_2-$, wherein n is 1; or a derivative of an alkylated aryl mono or disulfonic acid consisting of the anhydrides, esters, epoxy blocked sulfonic acid esters, acetylates, and amine salts thereof which is hydrolyzable to the alkylated aryl mono or disulfonic acid. Strong acids, blocked or unblocked, are preferred over weak acids.

Preferably, the aryl group is naphthalene such as in dinonyl naphthalene disulfonic acid. When the aryl disulfonic acid is structure II, preferably n is 0, or X is oxygen and n is 1, or X is S and n is 1 to 3, or X is $S(O)_2$ and n is 1. The above naphthalene derivative may be an epoxy blocked sulfonic acid wherein one or both of the sulfonic acid groups is reacted with an epoxide to provide mono- or di-beta-hydroxy sulfonic acid ester. Suitable epoxy compounds for preparing an epoxy blocked sulfonic acid include diglycidyl ethers of bisphenol A or bisphenol F; diglycidyl ethers of a glycol, such as ethylene glycol, propylene glycol or butane diol; monoglycidyl ethers of $C_1$ to $C_{18}$ alpha-olefin epoxides and 1,2-epoxycyclohexane. Another preferred acid is dodecylbenzene sulfonic acid, Polymer Composition:

The polymer composition from which a cable sheath or other article of manufacture is fabricated may or may not comprise an acid catalyst. If such a catalyst is present, then the composition comprises at least 0.01, preferably at least 0.02 and more preferably at least 0.03, wt % of the catalyst. The only limit on the maximum amount of acid catalyst in the composition is that imposed by economics and practicality (e.g., diminishing returns), but typically a general maximum comprises less than 5, preferably less than 3 and more preferably less than 2, wt % of the composition.

The polymer composition from which a cable sheath or other article of manufacture is fabricated comprises at least 0.01, preferably at least 0.03 and more preferably at least 0.05, wt % of the polyfunctional alcohol. The only limit on the maximum amount of polyfunctional alcohol in the composition is that imposed by economics and practicality (e.g., diminishing returns), but typically a general maximum comprises less than 5, preferably less than 3 and more preferably less than 2, wt % of the composition.

Cure may be promoted with a crosslinking co-catalyst, and any co-catalyst that is not an acid that will provide this function can be used in this invention. These co-catalysts generally include organic bases (but generally not with acid catalysts), carboxylic acids, and organo-metallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective. The catalyst (or mixture of catalysts) is present in the composition in a catalytic amount, typically in an amount between 0.01 and 2 phr.

The polymer composition from which the cable sheathing or other article of manufacture is made can be filled or unfilled. If filled, then the amount of filler present should preferably not exceed an amount that would cause unacceptably large degradation of the electrical and/or mechanical properties of the silane-crosslinked, polyolefin polymer. Typically, the amount of filler present is between 2 and 80, preferably between 5 and 70, weight percent (wt %) based on the weight of the polymer. Representative fillers include kaolin clay, magnesium hydroxide, silica, calcium carbonate.

In a preferred embodiment of this invention in which a filler is present, the filler is coated with a material that will prevent or retard any tendency that the filler might otherwise have to interfere with the silane cure reaction. Stearic acid is illustrative of such a filler coating. Selection of filler and catalyst must be made to avoid any undesired interactions and reactions.

Other additives can be used in the preparation of and be present in the polymer composition of this invention, and these include but are not limited to antioxidants, processing aids, pigments and lubricants.

Compounding of the silane-functionalized polyolefin polymer, polyfunctional alcohol and acid catalyst, if any, can be effected by standard means known to those skilled in the art. Examples of compounding equipment are internal batch mixers, such as a Banbury™ or Bolling™ internal mixer. Alternatively, continuous single or twin screw mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness, Articles of Manufacture:

The polymer composition of this invention can be applied to a cable as a sheath or insulation in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. In a preferred embodiment of this invention in which the polyolefin polymer is a ethylene polymer with a melt index (I2 of about 1 to 7 g/10 min), the insulation sheath coated onto the cable will cure within 10 days at ambient temperature.

Other articles of manufacture that can be prepared from the polymer compositions of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

The following examples further illustrate the invention. Unless otherwise stated, all parts and percentages are by weight.

SPECIFIC EMBODIMENTS

Comparative Examples 1-3 and Examples 1-3:

The resin used in all of the examples is SI-LINK A6451 ethylene-silane reactor copolymer (1.5 weight percent VTMS). NACURE XC-B201 sulfonic acid and NACURE 1419 blocked sulfonic acid (both available from King Industries), and α,α,α', α'-tetramethyl-1,3-benzenedimethanol (BDM) are also used. The polymer composition is formulated as follows:

1. A Brabender mixing bowl mixed at 30 revolutions per minute (rpm) is used to make 40 grams of the composition,
2. The resin is added and fluxed for 3 minutes at 125° C.
3. The sulfonic acids and/or BDM are added and mixed for additional 3 minutes 125° C.

Figure 2:
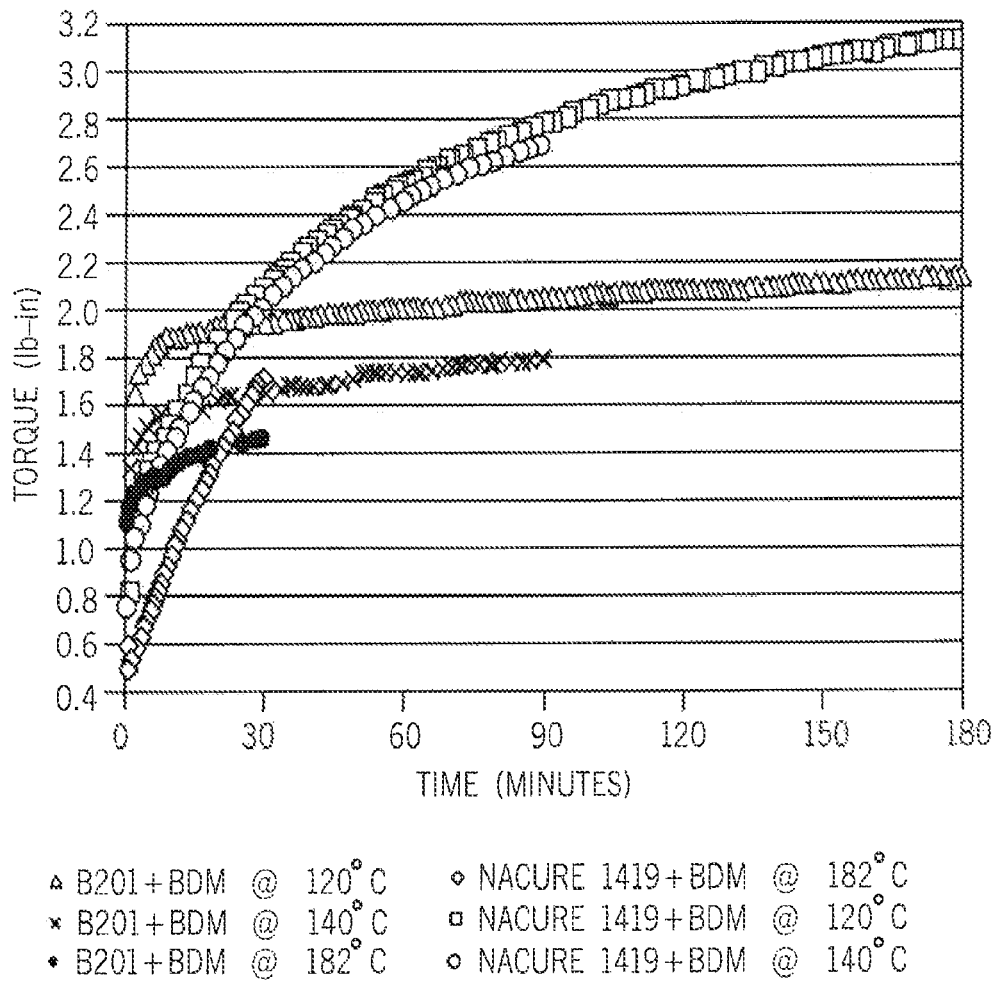
FIG. 2 is a graph reporting the effect of temperature on in situ moisture generation and crosslinking of an ethylene-silane reactor copolymer with sulfonic acids.

The crosslinking kinetics are investigated using a moving die rheometer (MDR) at temperatures from 120° C. to 182° C. (FIGS. 1 and 2). In all cases, diffusion of ambient moisture occurred from the environment.

Referring to FIG. 1, the A6451 polymer by itself does not crosslink within 30 minutes at 182° C. Even if partial hydrolysis occurs, condensation is not evident. The addition of BDM does not have an effect initially, but after an induction period of about 8 minutes, the torque starts to increase. This suggests that slight hydrolysis and condensation is in progress, sufficient to yield light crosslinking for improved melt strength.

The use of NACURE XC-B201 and NACURE 1419 sulfonic acids leads to higher values of minimum torque, and this indicates that slight crosslinking is occurring during melt mixing in the Brabender (FIG. 1). Moisture diffusion from the environment (in the MDR experiment) results in slower crosslinking of A6451 with NACURE 1419 (blocked sulfonic acid) as compared with NACURE XC-B201 (unblocked sulfonic acid) at a temperature representative of extrusion processes. The relatively higher concentration of NACURE 1419 is used due to the lower acid concentration in this product. If BDM is added along with sulfonic acid catalysts, there is a rapid and undesirable increase in torque with the unblocked B201 catalyst rendering the composition not amenable to melt processing, and a substantially lower crosslinking with the blocked sulfonic acid catalyst thus rendering the composition amenable to melt processing. Moreover, the ultimate level of crosslinking is desirably higher with the blocked sulfonic acid in combination with BDM. Similar trends are obtained at 120° C.; and 140° C. with the composition containing blocked sulfonic acid plus BDM less sensitive to temperature.

Comparative Examples 4-5 and Examples 4-6:

The resin used was SI-LINK A6451 ethylene-silane reactor copolymer. Nacure XC-B201 sulfonic acid (product of King Industries), α,α,α',α'-Tetramethyl-1,3-benzenedimethanol (BDM), 2-Methyl-1-phenyl-2-propanol and 3-Phenyl-1-propanol were added as follows:

Used Brabender mixing bowl at 30 rpm to make 2.50 grams of the formulations.
Added resin, and fluxed for 5 minutes at 12.5° C.
Added sulfonic acids and alcohol, and mixed for additional 5 minutes at 125° C.

The crosslinking kinetics were investigated using MDR.

Figure 3:
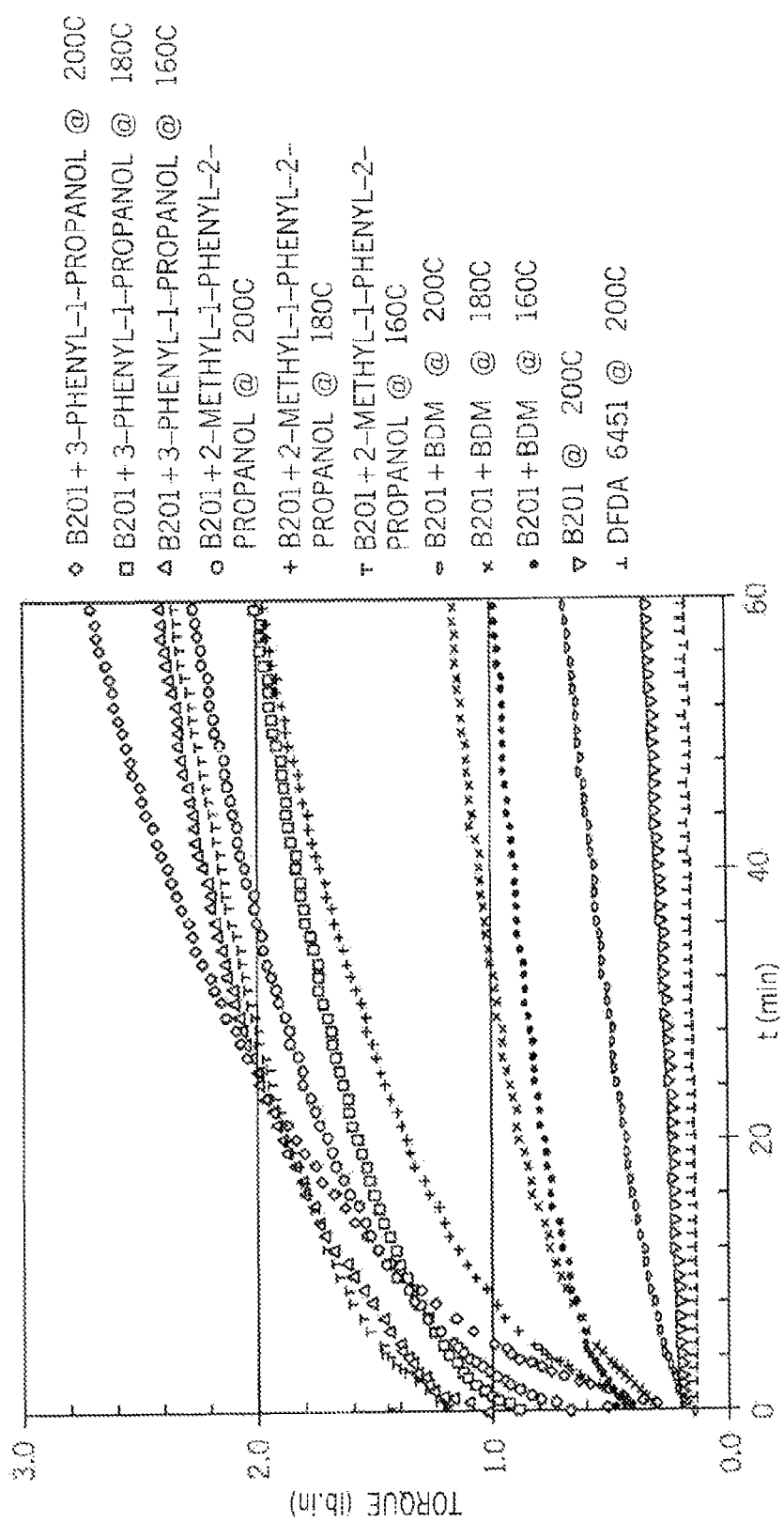
FIG. 3 is a graph reporting the effect of alcohol reactivity on insitu moisture generation and crosslinking of an ethylene-silane reactor copolymer at different temperatures.

One way of achieving a consistent moisture release rate is to use a less active alcohol instead of BDM or to use a mono-functional alcohol having less alcohol groups on a molar basis. FIG. 3 illustrates this concept of using alcohols of different reactivities towards elimination reactions with acid catalysts to release water. In the absence any catalyst or alcohol the polymer does not incur any crosslinking as shown in the MDR data for DFDA 6451 (Comparative Example 4) which shows a flat torque profile. This observation is consistent at all temperatures. Upon addition of acid catalyst (Comparative Example 5) there is a slow yet distinct increase in torque values. For the range of temperatures tested the torque value does not rise above 0.2 lb. in at 60 minutes under any conditions. This is due to the limited amount of water that is available for hydrolysis and crosslinking of silanes.

MDR data for BDM (Example 4), particularly at 180° C. and 200° C., used with B-201 shows a rapid increase in torque which implies very fast crosslinking kinetics. Using 2-Methyl-1-phenyl-2-propanol (Example 5) results in a steady increase in torque. This indicates slower, yet consistent moisture release rate and renders the material more amiable towards melt processing. It is also noteworthy that the maximum torque value is comparable to BDM. The use of a primary alcohol which has lower activity further decreases moisture release rates. The use of 3-Phenyl-1-propanol (Example 6) instead of the tertiary alcohols results in a reduced moisture release as indicated by a diminished rate of change in torque.

FIG. 3: Effect of alcohol reactivity on Insitu Moisture Generation and Crosslinking of A6451 Ethylene-Silane Reactor Copolymer at different temperatures.

FIG. 3 also depicts qualitatively the cure kinetics of these processes. No noteworthy trends with changing temperature were observed in any of the cases. This would point to a low activation energy for these processes. The low level of cure with the primary alcohol is consistent with its inherent reactivity. Primary alcohols may also engage in ether formation either with another molecule of alcohol or silanol which would affect the cure level.

The same polymer compositions were molded into 0.050 inch plaques at 130° C. Dog bones cut form these samples were cured at 90° C. and hot creep experiments were performed to monitor cure. All samples were tested prior to curing to establish baseline performance.

The following Table presents the percent (%) elongation for these samples for hot creep experiments performed at 150° C. using 20N force, BDM is a very active alcohol and starts to cure the copolymer while mixing. Thus the % elongation is low for the crosslinked material even at 0 hrs of curing time. The effect of alcohol reactivity on cure rate is noteworthy. Using 2-Methyl-1-phenyl-2-propanol results in a material that is not crosslinked to begin with and has a cure rate comparable to BDM. Further lowering of alcohol reactivity by using a primary alcohol, like 3-Phenyl-1-propanol results in much reduced cure rates. This material does not reach comparable cure degree even after 16 his of cure time.

TABLE 1

Hot creep results (% elongation) for 0.050 inch plaques made at 130° C. at different cure times

| | 0 hrs | 3 hrs | 16 hrs |
|---|---|---|---|
| A 6451 | failed | failed | failed |
| B201 | failed | 30.97 | 18.11 |
| B201 + 3-Phenyl-1-propanol | failed | 26.7 | 20.4 |
| B201 + 2-Methyl-1-phenyl-2-propanol | failed | 10.24 | 6.30 |
| B201 + BDM | 14.57 | 10.63 | 2.36 |

Although the invention has been described in considerable detail by the preceding specification, this detail is for the purpose of illustration and is not to be construed as a limitation upon the following appended claims. All U.S. patents, allowed U.S. patent applications and U.S. Patent Application Publications are incorporated herein b reference.

What is claimed is:

1. A polymer composition comprising:
   (i) A silane-functionalized polyolefin,
   (ii) A polyfunctional alcohol wherein the polyfunctional alcohol is α,α,α',α'-tetramethyl-1,3-benzenedimethanol and,
   (iii) A blocked, strong acid,
   the composition characterized in that the dehydration of the alcohol accelerates moisture-induced crosslinking of the composition at a temperature from 120° C. to 200° C. relative to a composition comprising only the silane-functionalized polyolefin and the blocked, strong acid and having the same weight percentage of the blocked, strong acid.

2. The composition of claim 1 wherein the silane-functionalized polyolefin is a copolymer of ethylene and vinyl trialkoxy silane monomers.

3. The composition of claim 1 wherein the blocked strong acid is an alkylated aryl disulfonic acid.

4. The composition of claim 3 wherein the alkylated aryl disulfonic acid has one of the following structures:

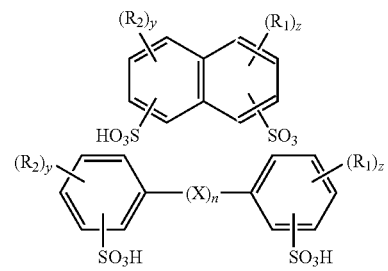

wherein each of $R_1$ and $R_2$ is the same or different and is a linear or branched alkyl group with 6 to 16 carbons, y is 0 to 3, z is 0 to 3 with the proviso that y +z is 1 to 4, n is 0 to 3, X is a divalent moiety selected from the group consisting of —C($R_3$)($R_4$)—, wherein each of $R_3$ and $R_4$ is hydrogen or independently a linear or branched alkyl group of 1-4 carbons and n is 1; —C(=O)—, wherein n is 1; —O— wherein n is 1 to 3; and —S(O)$_2$—, wherein n is 1.

5. The composition of claim 1 wherein the polyfunctional alcohol is present in an amount ranging from about 0.01 to about 5 wt %, based on the total weight of the composition.

6. The composition of claim 1 wherein the acid is present in an amount ranging from about 0.01 to about 5 wt %, based on the total weight of the composition.

7. A fabricated article comprising the polymer composition of claim 1.

8. The article of claim 7 in which the article is a cable sheath or cable jacket.

9. The article of claim 7 in which the article is a fiber, ribbon, sheet, tape, tube, pipe, weather-stripping, seal, gasket, foam, footwear or bellows.

* * * * *